Aug. 22, 1950 C. D. JEFFRIES ET AL 2,519,765

FREQUENCY MEASURING SYSTEM

Filed May 8, 1946 2 Sheets-Sheet 1

FIG. I

INVENTOR
CARSON D. JEFFRIES
HORACE E. OVERACKER
BY

William D. Hall.

ATTORNEY

FREQUENCY MEASURING SYSTEM

Filed May 8, 1946 2 Sheets-Sheet 2

INVENTORS.
CARSON D. JEFFRIES
HORACE E. OVERACKER
BY William D. Hall
ATTORNEY

Patented Aug. 22, 1950 2,519,765

UNITED STATES PATENT OFFICE 2,519,765

FREQUENCY MEASURING SYSTEM

Carson D. Jeffries, Palo Alto, and Horace E. Overacker, San Francisco, Calif., assignors to United States of America as represented by the Secretary of War Application May 8, 1946, Serial No. 668,300

4 Claims. (Cl. 250—39)

This invention relates, in general, to test apparatus and more particularly to frequency meters.

It is often desirable to be able to measure accurately the frequencies of oscillators and transmitters. When making such tests at frequencies in the order of several thousand megacycles, measurements become less accurate due, for example, to stray capacitances and inductances. It is an object, therefore, of this invention to provide a frequency meter which will measure frequencies in the order of several thousand megacycles with a greater degree of accuracy than has been possible heretofore.

In general, this invention utilizes three oscillator circuits and two mixer circuits. The output of the first oscillator, which is tunable over a range in the order of several hundred megacycles, is applied to the first mixer circuit, as is the frequency to be measured, and is also applied to the second mixer circuit along with the outputs of the second and third oscillator circuits, which latter are substantially of fixed frequencies in the order of several megacycles. The second and third oscillators are used to accurately calibrate the first oscillator. From audible beat notes at the output of the first mixer circuit, the unknown frequency may be determined.

Other objects, features and advantages of this invention will suggest themselves to those skilled in the art, and will become apparent from the following description, taken in connection with the accompanying drawing, wherein.

Figure 1:
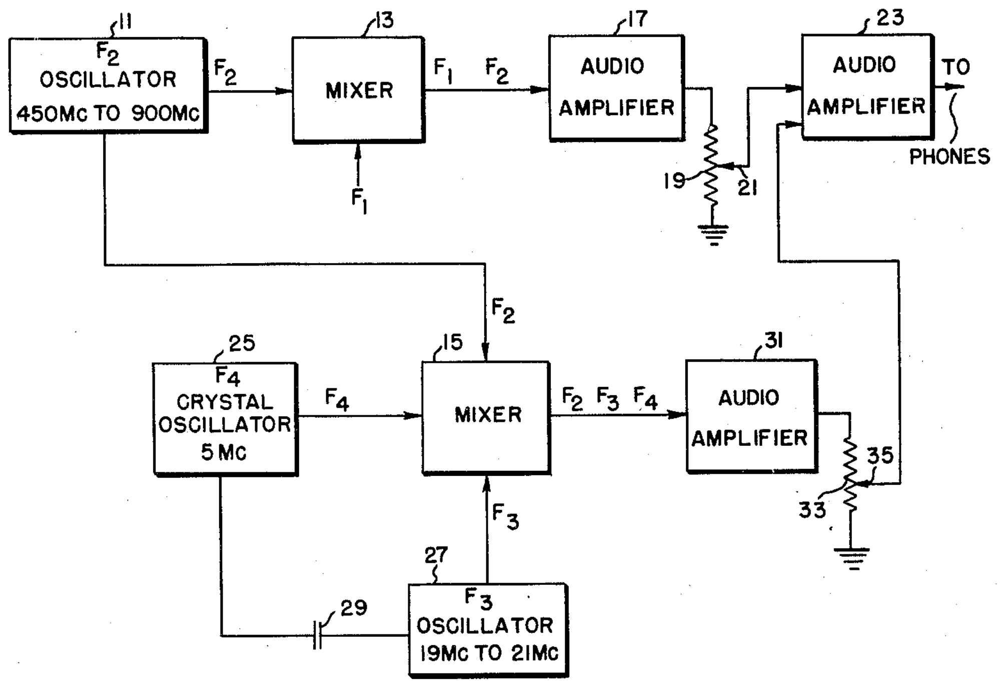
Fig. 1 is a schematic block diagram of the invention.

Referring now, more particularly, to Fig. 1, tunable oscillator 11 which operates at a frequency in the vicinity of several hundred megacycles is coupled to mixer circuits 13 and 15. The frequency of oscillator 11 is hereinafter referred to as $F_2$. The mixer 13 is coupled to an audio amplifier 17 whose output is applied across potentiometer 19. Arm or contact 21 of potentiometer 19 is coupled to a second audio amplifier 23 whose output is applied to a pair of headphones or any conventional indicating device (not shown). Oscillator 25, which operates at a substantially fixed frequency in the order of several megacycles is coupled to mixer 15. The frequency of oscillator 25 is hereinafter referred to as $F_4$. Oscillator 27, whose frequency is several times that of oscillator 25 is also coupled to the mixer 15. Oscillator 27 is tunable over a range of several megacycles. Its frequency is hereinafter referred to as $F_3$. A capacitor 29 couples oscillator 25 to oscillator 27. The output of mixer 15 is coupled to audio amplifier 31. The output of audio amplifier 31 is applied across potentiometer 33. Arm or contact 35 is coupled to audio amplifier 23. The unknown frequency or frequency to be determined is applied to mixer 13. This frequency is hereinafter referred to as $F_1$.

Figure 2:
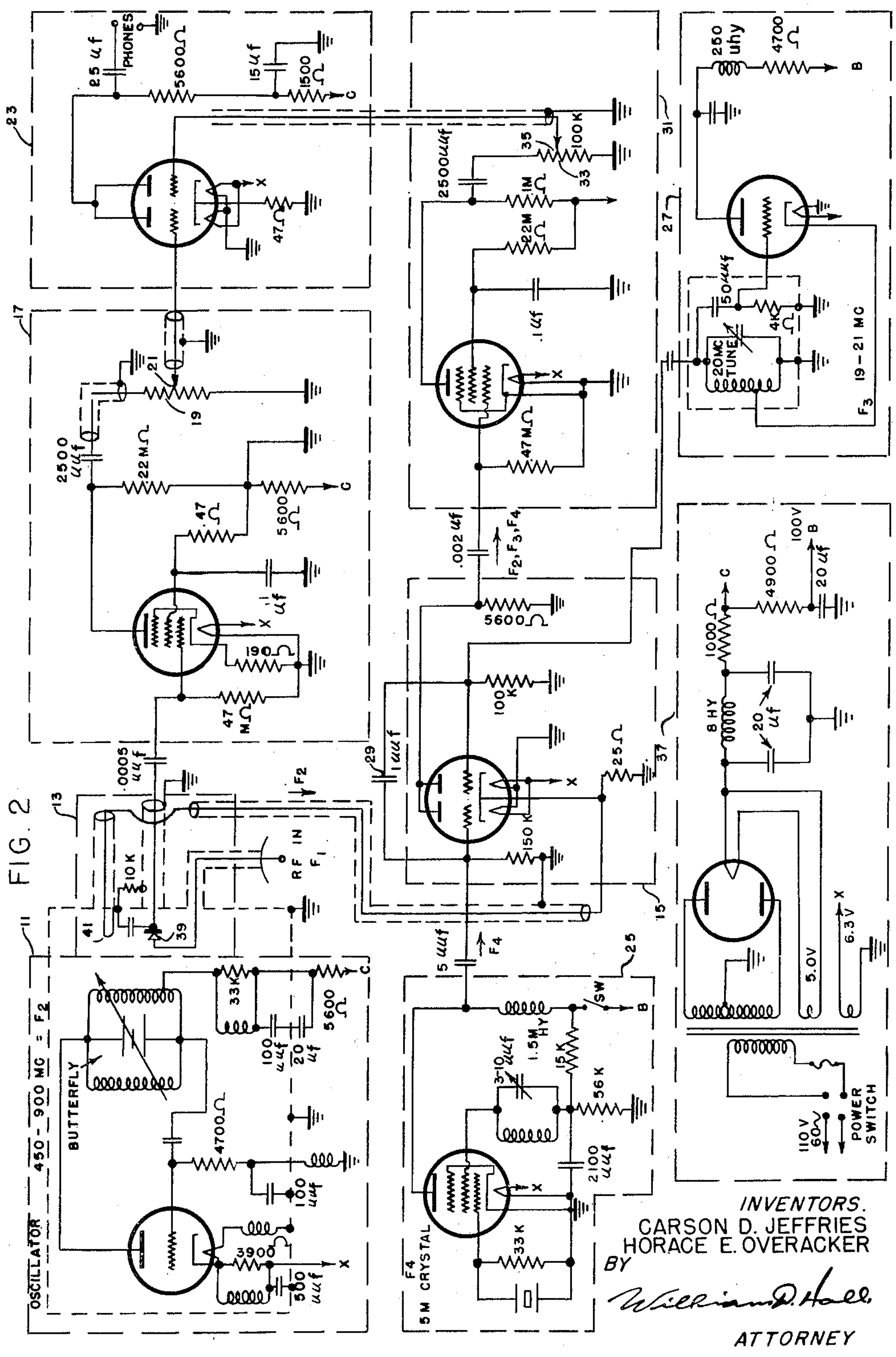
Fig. 2 is a schematic circuit diagram of the invention.

In practice, the circuit shown in Fig. 2 may be used. Oscillator 11 is a conventional butterfly type oscillator. Mixer 13 employs a crystal 39 and a loop 41 of wire magnetically coupled to oscillator 11, connected in series with the crystal, and used to mix the output of oscillator 11 with the unknown frequency. Audio amplifier 17 is of a conventional type. Audio amplifier 23 may utilize a duo-triode to provide a dual input. The plates of the duo-triode are connected together, and coupled to a pair of headphones. Oscillator 25 may be an electron-coupled crystal oscillator, and oscillator 27 of the Hartley type. Mixer 15 employs a duo-triode with frequencies $F_4$ and $F_3$ applied at the two grids and $F_2$ being applied at the cathode. Capacitor 29 connects the outputs of oscillators 25 and 27. Audio oscillator 31 may be of the conventional type employing a potentiometer in its output circuit. Power supply 37 is of the conventional full-wave rectifier type. In a circuit arrangement constructed in accordance with this invention, the circuit elements had the values indicated in Fig. 2.

In operation, the output of oscillator 11, which might be, for example, tunable over the range 450 megacycles to 900 megacycles, is mixed with the output of oscillator 25 whose frequency might be, for example, 5 megacycles. The output of mixer 15 is applied to audio amplifier 31 and amplified again by audio amplifier 23 and thence to the phones. Therefore, when oscillator 11 is being varied over its frequency bands, audible beat notes will be heard at the phones every 5 megacycles due to the harmonics of oscillator 25 beating with the oscillator 11 output. It will be seen then that the calibration of oscillator 11 may be made very accurate by observation of the beat notes.

The output of oscillator 11 is also mixed with the unknown frequency at mixer 13. The output of mixer 13 is amplified by audio amplifier 17 and again by audio amplifier 23 and thence applied to the phones.

As oscillator 11 is being varied over its frequency band, beat notes will be heard at the phones due to the unknown frequency beating with the harmonics of the oscillator 11 output. By observing the frequency settings of oscillator 11 at two consecutive beat notes, the unknown frequency may be readily calculated.

Accuracy is attained by interpolating between two successive 5 megacycle beat notes to determine an accurate reading of oscillator 11 at the beat notes of $F_1F_2$.

Oscillator 27 whose frequency range might be, for example, 19 megacycles to 21 megacycles, is also coupled to mixer 15. Oscillator 27 is tuned by beat notes with frequency $F_4$ to oscillate, in this case, at 20 megacycles. To keep the frequency of oscillator 27 (hereinafter referred to as $F_3$) at substantially 20 megacycles, capacitor 29 couples the output of oscillator 25 to oscillator 27 whereby oscillator 27 locks in on the fourth harmonic of $F_4$.

Oscillator 27 provides beat notes every 20 megacycles as oscillator 11 is varied. This is to provide accurate check points on the upper end of the scale of oscillator 11 at which place the harmonics of $F_4$ may be too weak to be distinguishable.

Potentiometers 19 and 33 are used to adjust the volume of the beat notes in the headphones and also to permit listening to one channel at a time.

Since the scale of the butterfly type oscillator is substantially linear, interpolation on the scales is thereby simplified. The oscillator 25, which is the standard of the apparatus, is designed to oscillate accurately at 5 megacycles and to be relatively rich in harmonics.

While there has been described what is at present considered to be the preferred embodiment of this invention it will be obvious to those skilled in the art that various changes and modifications may be made therein without departing from the scope of the invention as set forth in the appended claims, and I claim all such changes and modifications as fall fairly within the spirit and scope of the invention.

What is claimed is:

1. In a frequency meter, a tunable butterfly type oscillator, means for mixing the output of said tunable oscillator with a high frequency voltage from an external source, a first amplifying means coupled to said mixing means, a first potentiometer connected across the output of said first amplifying means, a second amplifying means provided with first and second inputs and a single output, means for coupling said first potentiometer to said first input of said second amplifying means, indicator means for reproducing the output of said second amplifying means, a substantially fixed frequency crystal type oscillator, a narrow frequency range oscillator whose frequency is several times that of said fixed frequency oscillator, capacitor means for coupling the fixed frequency oscillator to the narrow range oscillator, means for mixing the outputs of said tunable oscillator, said fixed frequency oscillator and said narrow range oscillator, a third amplifying means coupled to the output of said latter mixing means, a second potentiometer connected across the output of said third amplifying means, and means coupling said second potentiometer to said second input of said second amplifying means.

2. In a frequency meter, a tunable oscillator, means for mixing the output of said tunable oscillator with a high frequency voltage from an external source, a first amplifying means coupled to said mixing means, a first potentiometer connected across the output of said first amplifying means, a second amplifying means provided with first and second inputs and a single output, means for coupling said first potentiometer to said first input of said second amplifying means, indicator means for reproducing the output of said second amplifying means, a substantially fixed frequency oscillator, a narrow frequency range oscillator whose frequency is several times that of said fixed frequency oscillator, capacitor means for coupling the fixed frequency oscillator to the narrow range oscillator, means for mixing the outputs of said tunable oscillator, said fixed frequency oscillator and said narrow range oscillator, a third amplifying means coupled to the output of said latter mixing means, a second potentiometer connected across the output of said third amplifying means, and means coupling said second potentiometer to said second input of said second amplifying means.

3. In a frequency meter, a tunable oscillator, means for mixing the output of said tunable oscillator with a high frequency voltage from an external source, means for detecting the output of said mixing means, a substantially fixed frequency oscillator, a narrow frequency range oscillator whose frequency is several times that of said fixed frequency oscillator, means for mixing the outputs of said tunable oscillator, said fixed frequency oscillator, and said narrow range oscillator, capacitor means for coupling said fixed frequency oscillator to said narrow range oscillator, and means for detecting the output of said latter mixing means.

4. In a frequency meter, a tunable oscillator, means for mixing the output of said tunable oscillator with a high frequency voltage from an external source, means for detecting the output of said mixing means, a substantially fixed frequency oscillator, means for mixing the output of said tunable oscillator with the output of said fixed frequency oscillator, and means for detecting the output of said latter mixing means.

CARSON D. JEFFRIES.
HORACE E. OVERACKER.

REFERENCES CITED

The following references are of record in the file of this patent:

UNITED STATES PATENTS

| Number | Name | Date |
|---|---|---|
| 1,966,230 | Andrew | July 10, 1934 |
| 1,982,340 | Forbes | Nov. 27, 1934 |
| 2,017,712 | Downey | Oct. 15, 1935 |
| 2,131,559 | Granger | Sept. 27, 1938 |
| 2,186,182 | Stocker | Jan. 9, 1940 |
| 2,363,835 | Crosby | Nov. 28, 1944 |